(12) United States Patent
Mörwald et al.

(10) Patent No.: US 6,969,245 B2
(45) Date of Patent: Nov. 29, 2005

(54) INJECTION MOLDING MACHINE HAVING A HANDLING DEVICE

(75) Inventors: Rupert Mörwald, Schwertberg (AT); Engelbert Kastner, Perg (AT)

(73) Assignee: Engel Maschinenbau Gesellschaft m.b.H., Schwertberg (AT)

(*) Notice: Subject to any disclaimer, the term of this patent is extended or adjusted under 35 U.S.C. 154(b) by 165 days.

(21) Appl. No.: 10/269,733

(22) Filed: Oct. 11, 2002

(65) Prior Publication Data

US 2003/0077348 A1 Apr. 24, 2003

(30) Foreign Application Priority Data

Oct. 18, 2001 (AT) .................................... 808/2001 U

(51) Int. Cl.[7] .............................................. B29C 45/80
(52) U.S. Cl. .................... 425/139; 425/165; 425/169; 425/173
(58) Field of Search ................... 425/169, 173, 425/139, 144, 165

(56) References Cited

U.S. PATENT DOCUMENTS

| 5,234,328 A | * | 8/1993 | Willson et al. | 425/139 |
| 5,470,218 A | * | 11/1995 | Hillman et al. | 425/144 |
| 6,485,285 B1 | * | 11/2002 | Shiotani | 425/139 |
| 6,529,796 B1 | * | 3/2003 | Kroeger et al. | 425/144 |

FOREIGN PATENT DOCUMENTS

| EP | 1085389 | 9/2000 |
| JP | 4155406 | 5/1992 |

* cited by examiner

Primary Examiner—Tim Heitbrink
(74) Attorney, Agent, or Firm—Notaro & Michalos PC

(57) ABSTRACT

Injection-moulding machine with at least one handling device, with an electronic stored-program control (SPC) for the injection-moulding machine and an electronic stored-program control for the handling device, characterized in that the stored-program control (SPC IMM, 17) for the injection-moulding machine (IMM) and the stored-program control (SPC R, 29) for the handling device (10) are realized on one and the same, common digital computer (30).

10 Claims, 3 Drawing Sheets

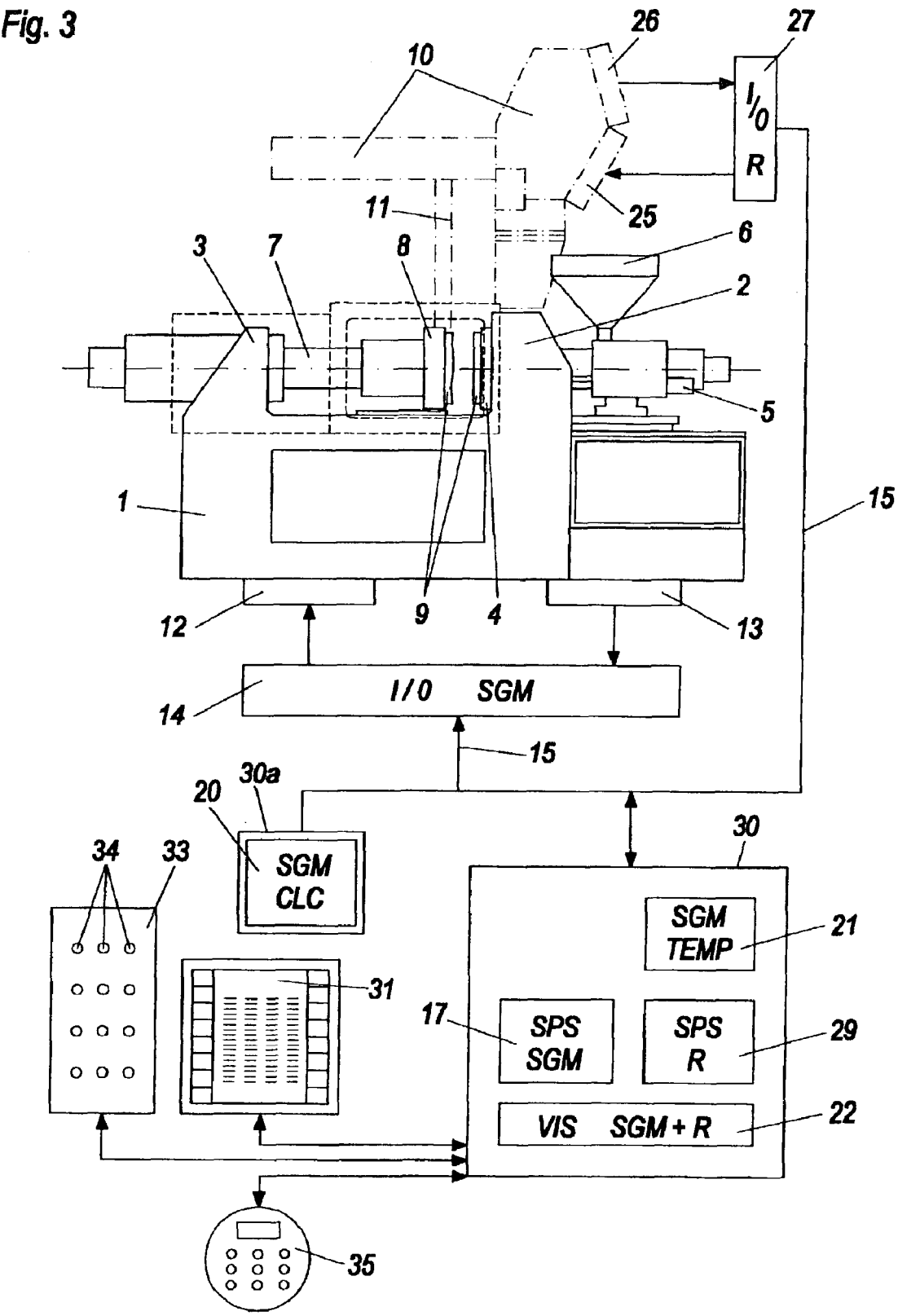

INJECTION MOLDING MACHINE HAVING A HANDLING DEVICE

FIELD AND BACKGROUND OF THE INVENTION

The invention relates to an injection-moulding machine with at least one handling device, with an electronic stored-program control (SPC) for the injection-moulding machine and an electronic stored-program control for the handling device.

Injection-moulding machines for manufacturing plastics articles usually have two mould halves relatively movable relative to each other. In the closed state, a viscous plastics material is injected via an injector unit. Following curing, the mould is opened and the finished plastics article removed. In order to remove this plastics article from the region of the opened mould halves in order to prepare the injection-moulding machine for the next cycle, handling devices, for example in the form of robots, are used which are capable of removing the plastics articles and transferring them for example onto a conveyor. Simpler handling devices are however also perfectly conceivable and possible.

It is already state of the art to control both the injection-moulding machine and the handling device each via a separate electronic stored-program control, i.e. two computers would be present, one for the injection-moulding machine and one for the handling device, on each of which the stored-program control has been implemented. An example of such a control is the applicant's control which has been sold for years under the name "ENGEL CC100".

SUMMARY OF THE INVENTION

To increase operating convenience and the control sequence of the injection-moulding machine on the one hand and to be able to better coordinate the handling device on the other, it is provided according to the invention that the stored-program control for the injection-moulding machine and the stored-program control for the handling device are realized on one and the same, common digital computer.

Using a high-capacity computer—preferably a single high-speed processor (CPU)—it is thus possible to control in coordinated manner both the injection-moulding machine itself and the allocated handling device (for example a bi- or multiaxial linear robot or an articulated-arm robot) over a series of injection cycles. The outlay on hardware is reduced because only a single computer with a processor is now required. Operating convenience can be easily increased by providing a common display apparatus for displaying data relating to the injection-moulding machine on the one hand and data relating to the handling device on the other. This can be developed in particular as a touchscreen so that data input is also possible. The injection-moulding machine on the one hand and the handling device on the other can be easily accessed with the same type of user interface, a rapid switchover between these two user interfaces being possible, for example by means of shortcut keys.

To achieve user-friendly programming and operation of the system, it can be provided that the common computer for the stored-program controls of the injection-moulding machine and handling device is connected to at least one display apparatus and/or a data input apparatus, and communication software is installed on the common computer between the stored-program controls on the one hand and the display apparatus and/or data input apparatus on the other. The communication software can for example provide a graphic user interface to which even unpractised users can easily become accustomed without knowing the details of the programming of the actual stored-program control. The particular advantage with a system according to the invention is that the user need not retrain between injection-moulding machine and handling device, but essentially needs only to switch between injection-moulding machine and handling device to be able to program or operate there similar or analogous functions with similar or analogous symbols or steps.

In particular when using very high-capacity computers, it can preferably be provided that not only the stored-program controls for the injection-moulding machine and the handling device are implemented on the common computer but also a real-time control apparatus for the injection-moulding process and/or a temperature regulator for the injection moulds. Previously these real-time control apparatuses or also the temperature regulator were housed externally because of the high computer capacity required, and provided with their own processor (CPU) which was connected via a data bus to the main computer in the control panel of the computers. A further simplification of the hardware by implementing these control functions in the common console is now possible.

BRIEF DESCRIPTION OF THE DRAWINGS

Further advantages and details of the invention be explained in more detail using the following description of the figures:

FIG. 3 shows a modified further embodiment.

DESCRIPTION OF THE PREFERRED EMBODIMENTS

Figure 1:
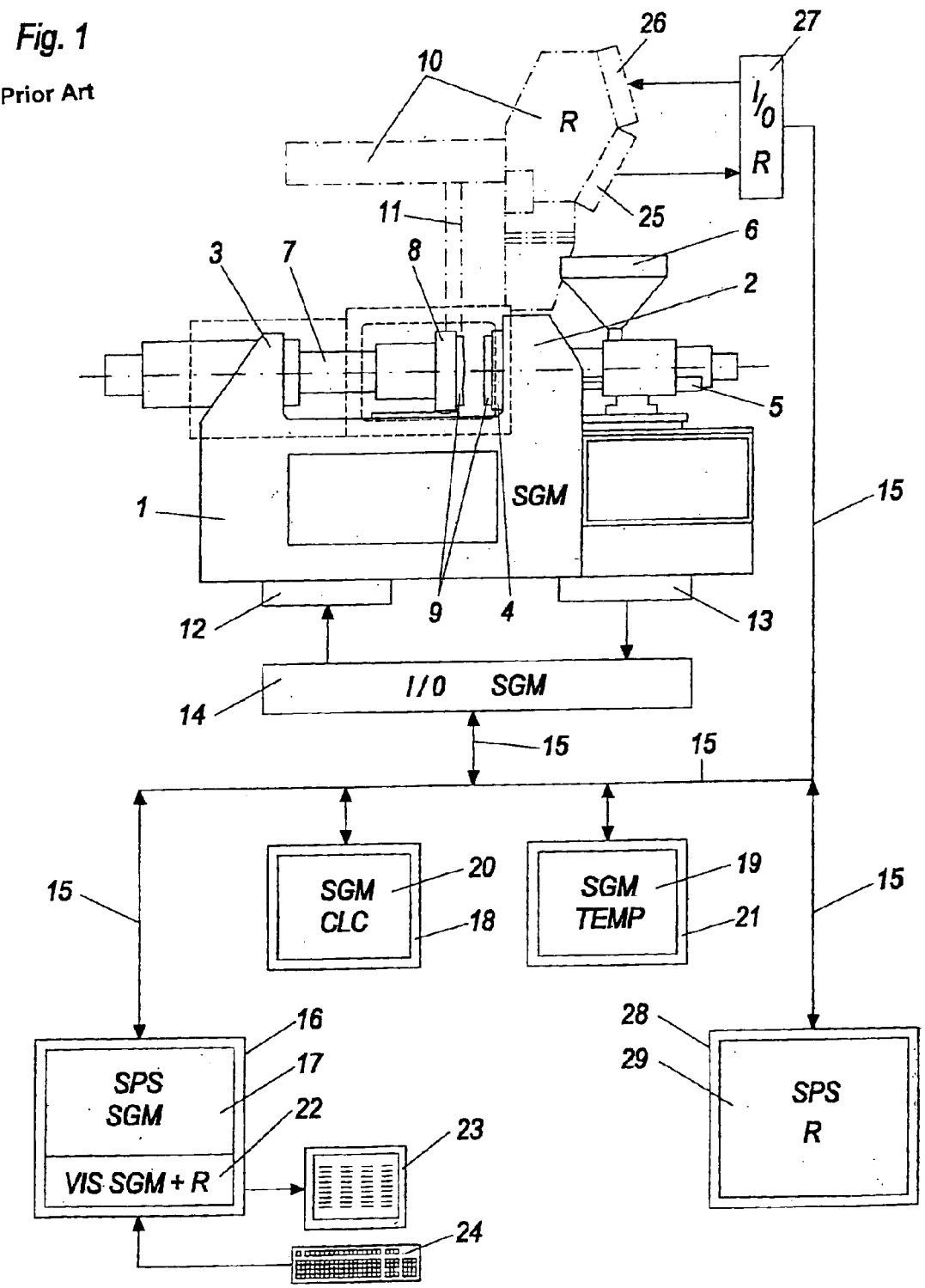
FIG. 1 shows, schematically, an injection-moulding machine with a handling device and also electronic control components according to the state of the art.

The injection-moulding machine (IMM) is constructed according to the state of the art: it has an essentially U- or C-shaped frame 1 with two arms 2 and 3. A stationary platen 4 which bears one of two mould halves 9 is attached to the right-hand arm 2 in FIG. 1. The other mould half 9 is attached to the movable platen 8 which can be moved back and forth in horizontal direction via a hydraulic piston cylinder unit. The hydraulic piston cylinder apparatus 7 rests on the left-hand arm 3. FIG. 1 shows the mould in partly opened position. To close the mould, the platen 8 is moved to the right until the two mould halves 9 are closed. Plastics material which has preferably been fed in in granular form via the hopper 6 is then injected into the closed mould in plasticized, i.e. at least viscous form, via the injector unit 5 which has a screw extruder for example. After a cooling phase, the mould is opened and the plastics article can be removed via the handling device (here for example a biaxial linear robot R, 10). To this end, the latter has grippers, not shown in more detail, on the arm 11 pointing vertically downwards. All the above mechanical or hydraulic or electric components need not be described in more detail as they are already very well known to a person skilled in the art in the field of injection moulding.

The control components for the injection-moulding machine IMM and the handling device R in the embodiment according to the state of the art in FIG. 1 are also known.

They will therefore be described briefly only in the following in order to be able later to better represent the difference between the invention and the state of the art with reference to the versions according to the invention in FIGS. 2 and 3.

Several preferably electrically operable actuators 12 are provided on the injection-moulding machine. These actuators 12, represented very schematically, are naturally arranged inside the injection-moulding machine in reality and consist for example of switches, electrically operable solenoid valves for the hydraulics or similar. The components of the injection-moulding machine can essentially be moved in a controlled way via same.

To discover the actual state of the current movement sequence, numerous sensors collectively numbered 13 are provided. The sensor data and the control commands for the actuators 12 can be made to communicate with a bus system 15 via an input/output logic which can also be distributed over several cards (I/O IMM, 14).

To control the injection-moulding machine, i.e. for time-orientated control of the actuators 12 depending on the signals from the sensors 13, a console 16 is provided which has a processor (CPU). The stored-program control (SPC IMM, 17) is implemented on the console. This stored-program control 17 specifies in a manner pre-programmable by the user or manufacturer the sequence of the individual steps, for example the opening and closing of the mould halves 9. While the SPC 17 ensures the ordered sequence, rapid control processes which are required during an injection cycle, as well as the temperature regulator, are carried out by dedicated computers 18 and 19 each of which has its own processor. The injection process control (closed loop control CLC) is identified as IMM CLC 20 and the temperature regulator as IMM TEMP 21.

Communication software (or display software) DIS IMM+R, 22, is also implemented on the central console, and data relating to the injection-moulding machine to be displayed on a screen 23, and data to be input via a keyboard 24.

The handling device 10, for example a bi- or multiaxial linear robot with electric servomotor drive and electrically controlled grippers, is controlled via the common field bus 15 or a separate field bus. The actuators are numbered 25 here, the sensors 26. It should be mentioned again that this representation is very schematic. Naturally the actuators and sensors are arranged distributed over the handling device. An input/output logic 18 I/O R, 27 allows communication with the console 28 on which the stored-program control SPC R, 29 for the handling device 10 is implemented. The console 28 has its own CPU (processor).

Overall, therefore, in the state of the art, at least two processors are present in the two consoles 16 and 28, but in most cases there are several other processors, i.e. in the injection process control 18 and the temperature control 19, as well as optionally also in the input/output logic which, in addition to digital signals, can optionally also process analog signals.

As already mentioned, FIG. 1 corresponds to the state of the art.

Figure 2:
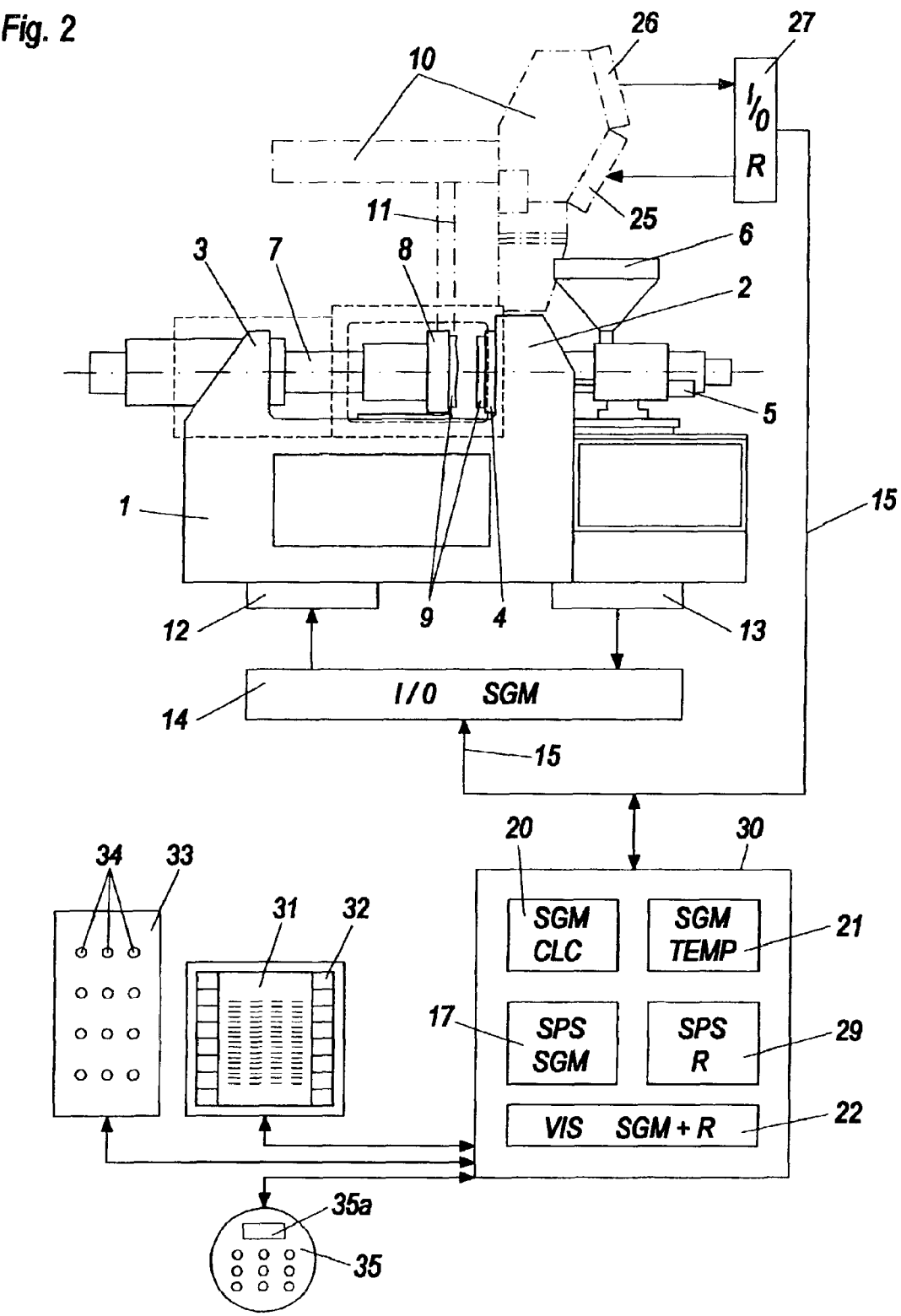
FIG. 2 shows a first embodiment of an injection-moulding machine with handling device with a control according to the invention.

The development according to the invention is now described using FIG. 2, the same reference numbers designating identical or equivalent parts as in FIG. 1. According to the invention it is provided according to FIG. 2 that the stored-program control SPC IMM, 17 is realized for the injection-moulding machine on the one hand the stored-program control SPC R, 29 for the handling device 10 on the other hand, on [one] and the same common digital computer 30 which preferably has a single processor. The hardware simplification is thus immediately apparent, in particular when further control components are also implemented on the same computer. This includes the real-time control IMM CLC 20 and the temperature regulator for the two mould halves IMM TEMP, 21. Above all in the case of smaller to medium-size systems, the computing capacity of a high-capacity processor is sufficient to be able to operate all these components in parallel (multi-tasking).

A communication program (DIS IMM+R, 22) can be implemented on the same common console 30. In principle however a single touchscreen 31 suffices to realize and input data, a shortcut key arranged in a side bar 32, for example a switch between "Injection-moulding machine" and "Handling device (robot)" is possible. Naturally, the data input can also be undertaken via a switch panel 33 with for example rotary switches 34 to which numerous users of injection-moulding machines are still accustomed. Finally it is also possible to input via a small hand-held data input and output apparatus 35 in particular data specific to handling devices but also in principle data specific to injection-moulding machines, and optionally to display them on a small screen 35a. As can be seen, the control according to FIG. 2 functions with a single console 30 with a single CPU. It is clear that through this common hardware a common graphic user interface and thus a uniform operation with increased convenience is also immediately possible.

With the embodiment shown in FIG. 3 for a large machine, the rapid real-time injection process control 20 is housed externally on a separate computer 30a which communicates with the field bus. This increases the overall capacity, and is used primarily for larger systems. Essentially however, with this version also, the stored-program control 17 for the injection-moulding machine and the stored-program control 29 for the handling device are implemented on one and the same console 30.

The overall result is therefore a common stored-program control, a common display and data input, as well as simplified common programming for injection-moulding machine and handling device. Various bus systems, in particular also optical bus systems or a CAN bus, can be used as field bus. Thus it is possible in simple manner to respectively co-control the handling devices (automation components) in machine-integrated manner, and to ensure easy operation, data storage, maintenance and process data acquisition.

What is claimed is:

1. An arrangement comprising an injection-moulding machine and at least one handling device for removing articles from the injection-moulding machine and for transferring these articles to a place remote from the injection-moulding machine, with an electronic stored-program control (SPC) for the injection-moulding machine and an electronic stored-program control for the handling device, characterized in that the stored-program control for the injection-moulding machine and the stored-program control of the handling device are realized on a common digital computer.

2. An arrangement according to claim 1, characterized in that the common digital computer for the stored-program controls of the injection-moulding machine and the handling device have a single processor.

3. An arrangement according to claim 1, characterized in that the common digital computer for the stored-program controls of the injection-moulding machine and the handling device is connected to at least one display device or a data input apparatus, and communication software is installed on the common digital computer between the stored-program controls in one instance and the display device or the data input apparatus in another instance.

4. An arrangement according to claim 3, characterized in that the common display apparatus is provided to display data relating to the injection-moulding machine in one instance and to display data relating to the handling device in another instance.

5. An arrangement according to claim 3, characterized in that at least part of the display apparatus and the data input apparatus are combined to form a touchscreen with a similar type of user interface for the injection-moulding machine and the handling device.

6. An arrangement according to claim 5, characterized in that shortcut keys can switch between the user interfaces for the injection-moulding machine and the handling device.

7. An arrangement according to claim 1, characterized in that a real-time control apparatus for the injection-moulding process or a temperature regulator for the injection moulds is also implemented on the common digital computer.

8. An arrangement according to claim 1, characterized in that the handling device is a linear robot with at least two movement axes.

9. An arrangement according to claim 8, characterized in that the two axes stand normal relative to each other.

10. An arrangement according to claim 1, characterized in that the handling device is an articulated-arm robot.

* * * * *